United States Patent [19]
Volk et al.

[11] Patent Number: 5,413,619
[45] Date of Patent: May 9, 1995

[54] PARTS CLEANING APPARATUS

[75] Inventors: Victor C. Volk, Hot Springs; James L. Rumburg, Arkadelphia, both of Ark.

[73] Assignee: Carrier Corporation, Syracuse, N.Y.

[21] Appl. No.: 192,511

[22] Filed: Feb. 7, 1994

[51] Int. Cl.⁶ .............................................. B01D 46/00
[52] U.S. Cl. .................................. 55/327; 55/385.7; 55/434; 55/508; 55/DIG. 18; 95/268
[58] Field of Search ...................... 55/327, 385.7, 434, 55/465, 495, 508, DIG. 18, DIG. 46; 95/268

[56] References Cited

U.S. PATENT DOCUMENTS

| | | | |
|---|---|---|---|
| 3,252,401 | 5/1966 | Smith | 55/DIG. 46 |
| 3,648,439 | 3/1972 | Szczepanski | 55/DIG. 46 |
| 4,050,367 | 9/1977 | Eakes | 55/DIG. 18 |
| 4,127,106 | 11/1978 | Jensen | 55/DIG. 18 |
| 4,249,463 | 2/1981 | Hornby | 55/DIG. 18 |
| 4,268,282 | 5/1981 | MacKenzie | 55/DIG. 18 |
| 4,832,717 | 5/1989 | Peters | 55/DIG. 18 |

OTHER PUBLICATIONS

"Chafco Downdraft Bench Grinder Table" Brochure of Chicago Air Filter Co., Mar. 1967.
"Ultrasonic Cleaning Systems" Brochure of Clean Room Products Oct. 1968.

*Primary Examiner*—Charles S. Bushey

[57] ABSTRACT

The blow off unit is an open top box with the front lower than the sides and back. A splash shield is placed at an angle at the back of the work area to deflect the blow off air stream and debris down into the collection filter. A space is left behind the splash shield to allow the blow off air to escape after it passes through the filter. The filter is a standard HVAC bag type air filter which hangs down into the box with its frame resting on the angle frame of the unit. A wire grill covers the filter for protection and to provide a place to lay parts. In use, the operator holds the part in the work area of the unit with one hand and blows the coolant and debris from the part down into the filter. The blow off compressed air is the only power source required for the unit. When the filter becomes dirty and/or saturated with coolant, it is replaced with a new one.

2 Claims, 3 Drawing Sheets

PARTS CLEANING APPARATUS

BACKGROUND OF THE INVENTION

In machining operations, particularly metal machining, the parts become coated with coolant which tends to cause metal chips to adhere to the piece being machined. With closer machining tolerances, chip size tends to be smaller thereby increasing the ease with which chips adhere to the part. In order to gage the part and perform subsequent operations, the chips and coolant must be removed, typically this would be done inside the machine or outside the machine in the open. Either choice presents safety and cleanliness problems. Also of prime concern, is the lost productivity of the machine while it is being used as a blow off receptacle. Other alternatives such as washers, solvents, or degreasers require more space, are more capital intensive, have higher operating costs, and present environmental and disposal problems.

SUMMARY OF THE INVENTION

A blow off unit is provided having a filter overlain by a grill. The unit has a shorter front portion such that the sides and back portion of the unit extend above the grill and filter and define a partially enclosed area. The filter does not extend to the back of the unit. A forwardly inclining back splash coacts with the sides and back of the unit to define an exhaust path. In use, the piece to be cleaned is held over or placed on the grill and air from a compressed air source is directed at the piece thereby freeing residual coolant and metal chips from the piece and directing them into the filter where they are collected. The compressed air passes through the filter and then through the exhaust path defined by the back and sides of the unit together with the back splash.

It is an object of this invention to provide a small portable means for removing coolant and metal chips from machined parts prior to gaging.

It is a further object of this invention to provide a method of cleaning machined parts.

It is another object of this invention to collect the coolant and metal chips removed from the machined part(s) being cleaned. These objects and others as will become apparent hereinafter, are accomplished by the present invention.

Basically, a filter collects coolant and metal chips blown off of a machined part within a region defined in part by the sides of the unit and a back splash. Compressed air directed at the machined part impinges thereon and dislodges coolant and metal chips which are carried into and collected by the filter with the compressed air stream passing through the filter and out of the unit via a path defined between the back of the unit and the back splash.

BRIEF DESCRIPTION OF THE DRAWING

For a fuller understanding of the present invention, reference should now be made to the following detailed description thereof taken in conjunction with the accompanying drawings wherein.

DESCRIPTION OF THE PREFERRED EMBODIMENT

Figure 1:
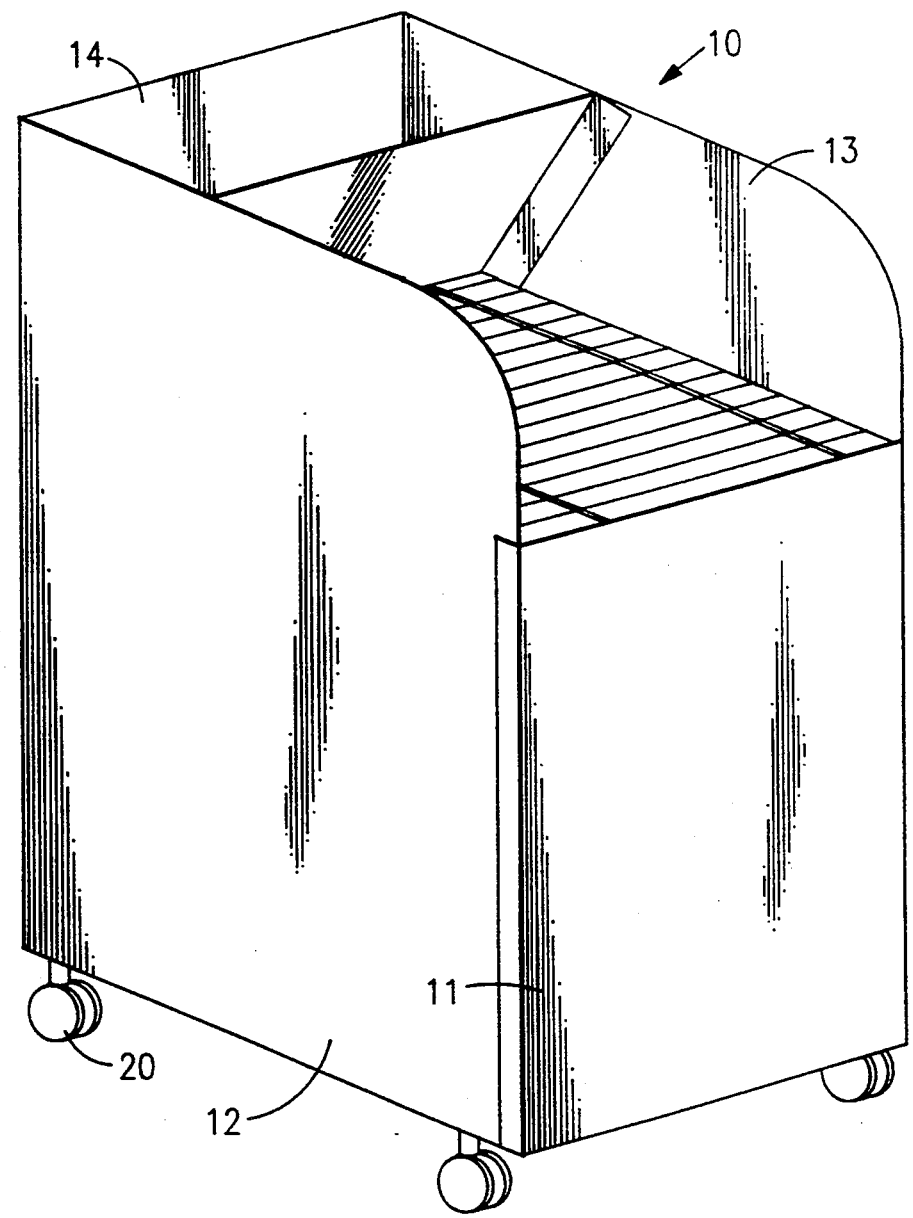
FIG. 1 is a pictorial view of the blow off unit.
Figure 4:
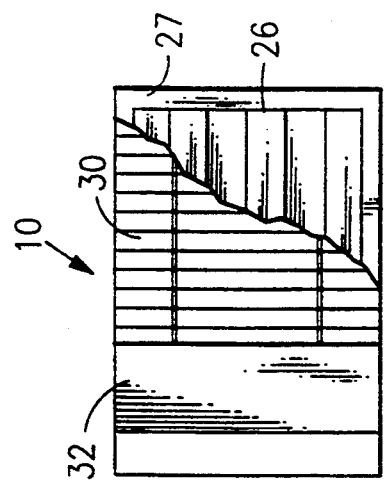
FIG. 4 is a top view of the blow off unit.
Figure 3:
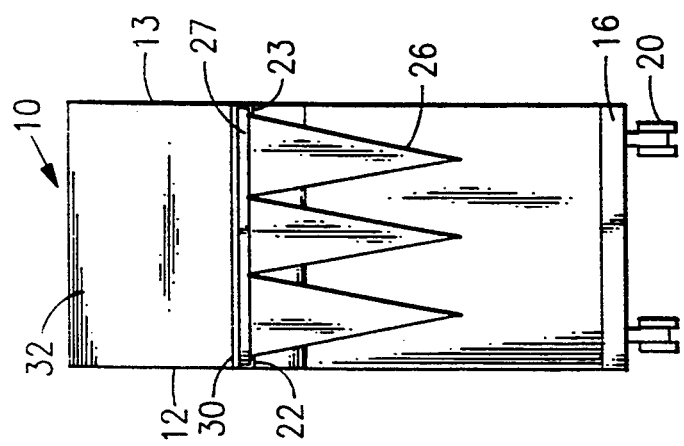
FIG. 3 is a front view of the blow off unit with the front panel removed.
Figure 2:
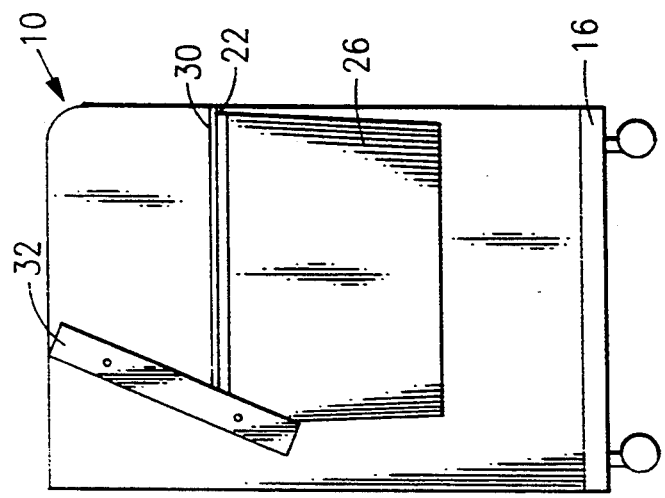
FIG. 2 is a side view of the blow off unit with the side panel removed.
Figure 5:
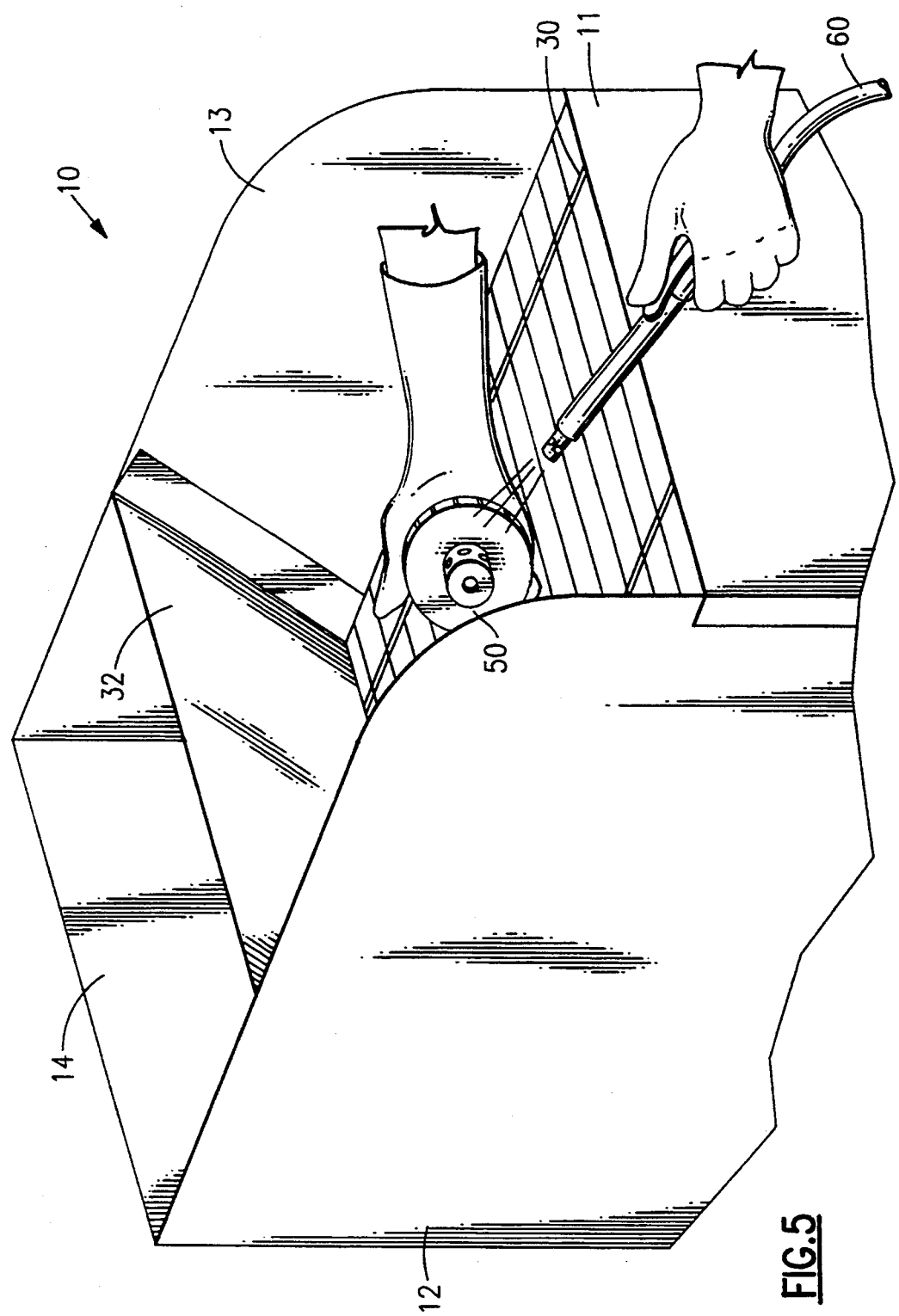
FIG. 5 is a view corresponding to FIG. 2 with the device in use.

In the Figures, the numeral 10 generally designates a blow off unit. Blow off unit 10 has a front panel 11, side panels 12 and 13 and a back panel 14. Preferably the side panels 12 and 13 and back panel 14 are a single piece of metal and are of the same height which is greater than that of front panel 11. As best seen in FIGS. 2 and 3, a bottom pan 16 is welded or otherwise suitably secured to the bottom of side panels 12 and 13 and back panel 14 thereby securing bottom pan 16 within unit 10. Casters 20 are secured to the bottom pan 16 in the regions of the corners. Angular support members 22 and 23 are welded or otherwise suitably secured to the side panels 12 and 13, respectively. Bag type air filter 26 has a frame 27 which is supported on support member 22 and 23. Grill 30 overlies and is supported by frame 27. Splash shield 32 is welded or otherwise suitably secured to side panels 12 and 13, respectively, with the lower end separated from back panel 14 and extending below support members 22 and 23. The upper end of splash shield 32 slopes away from the back panel 14 and defines therewith a portion of a discharge flow path.

In use, the blow off unit is preferably associated with a work area where parts are being machined and, as produced, have coolant and debris adhering thereto. After a piece is machined, the piece 50 it is placed on grill 30 or held above grill 30 in a region partially defined by side panels 12 and 13 and splash shield 32. Compressed air is supplied via line 60 and is directed by the operator at the piece 50. The compressed air impinges upon the piece 50 dislodging coolant and debris therefrom. The coolant and debris is carried by the compressed air and gravity into the filter 26 where the coolant and debris are collected while the compressed air passed through the filter 26 and out of unit 10 via the flow path defined between back panel 14 and splash shield 32.

The piece 50 and/or the discharge of line 60 are manipulated so that the entire surface of piece 50 is cleaned of coolant and debris, Because there is impingement, some of the air can be diverted and will impinge upon side panels 12 and 13 and/or splash shield 32 carrying coolant and debris therewith which can collect of these surfaces. The majority of the coolant and debris will be carried into the filter 26 and trapped. When filter 26 is saturated with coolant and/or filled with debris, the grill 30 is lifted, and filter 26 is removed for disposal. A new filter is set in place and grill 30 is then set in a overlying relationship and unit 10 is again ready for use.

Although a preferred embodiment of the present invention has been illustrated and described, other changes will occur to those skilled in the art. It is therefore intended that the scope of the present invention is to be limited only by the scope of the appended claims.

What is claimed is:

1. A blow off unit for use in combination with a source of compressed gas to remove adherent coolant and debris from a machined piece comprising:

a front panel having a top portion;
side panels;
a rear panel;
a bottom tray;
an open top;

said side panels and said rear panel being higher than said front panel;
filter means;
support means for supporting said filter means in said unit such that said filter means are located essentially flush with said top portion of said front panel;
grill means overlying said filter means;
splash shield means located in said unit in a spaced relationship to said rear panel and extending over a portion of said grill means with an upper portion being closest to said front panel whereby said side panels and said splash shield means coact to define a confined area over said filter means such that compressed gas directed at said machined piece in said confined area impinges on said piece so as to discharge adherent coolant and debris therefrom while said compressed gas serially passes through said filter means and between said splash shield means and said rear panel.

2. The blow off unit of claim 1 wherein said splash shield means extends below said top portion of said front panel.

* * * * *